United States Patent
Mao et al.

(10) Patent No.: US 8,646,168 B2
(45) Date of Patent: Feb. 11, 2014

(54) METHOD FOR MANUFACTURING A MAGNETIC WRITE POLE OF A PERPENDICULAR MAGNETIC WRITE HEAD USING NOVEL MASK FABRICATION

(75) Inventors: Guomin Mao, San Jose, CA (US); Sue Siyang Zhang, Saratoga, CA (US); Yi Zheng, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 10 days.

(21) Appl. No.: 13/251,082

(22) Filed: Sep. 30, 2011

(65) Prior Publication Data
US 2013/0081263 A1 Apr. 4, 2013

(51) Int. Cl.
*G11B 5/127* (2006.01)
*H04R 11/00* (2006.01)

(52) U.S. Cl.
USPC .................. 29/603.16; 29/603.12; 29/603.13; 29/603.14; 29/603.15; 29/603.18; 205/199; 205/122; 360/121; 360/122; 360/317; 451/5; 451/41

(58) Field of Classification Search
USPC ............... 29/603.07, 603.13–603.16, 603.18; 205/119, 122; 360/121, 122, 317; 451/5, 41
See application file for complete search history.

(56) References Cited

U.S. PATENT DOCUMENTS

| | | | |
|---|---|---|---|
| 5,462,896 A * | 10/1995 | Komura et al. | 438/268 |
| 8,018,023 B2 * | 9/2011 | Arai | 257/508 |
| 8,191,238 B2 * | 6/2012 | Demtchouk et al. | 29/603.16 |
| 2008/0290064 A1 * | 11/2008 | Yun | 216/26 |
| 2009/0128964 A1 * | 5/2009 | Guthrie et al. | 360/317 |
| 2009/0139080 A1 * | 6/2009 | Pentek et al. | 29/603.07 |

* cited by examiner

*Primary Examiner* — Paul D Kim
(74) *Attorney, Agent, or Firm* — Zilka-Kotab, PC

(57) ABSTRACT

A method for manufacturing a magnetic write pole of a magnetic write head for perpendicular magnetic recording. A magnetic write pole material is deposited, followed by union milling hard mask, a polymer mask under-layer followed by a dielectric hard mask material, followed by a photoresist. The photoresist is patterned to define a write pole shape and the shape of the patterned photoresist is transferred onto the underlying dielectric hard mask by a novel reactive ion etching that is performed in a chemistry that includes one or more fluorine containing gases and He. The presence of He in the reactive ion etching tool helps to improve the profile of the patterned dielectric hard mask. In addition, RIE parameters such a gas ratio (e.g. CF4 to CHF3 gas ratio) and power ratio (e.g. source power to bias power) are adjusted to optimize the profile of the patterned dielectric mask.

19 Claims, 14 Drawing Sheets

METHOD FOR MANUFACTURING A MAGNETIC WRITE POLE OF A PERPENDICULAR MAGNETIC WRITE HEAD USING NOVEL MASK FABRICATION

FIELD OF THE INVENTION

The present invention relates to perpendicular magnetic recording and more particularly to a method for manufacturing a magnetic write pole using a novel reactive ion etching mask fabrication.

BACKGROUND INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head can include a magnetic write pole and a magnetic return pole, the write pole having a much smaller cross section at the ABS than the return pole. The magnetic write pole and return pole are magnetically connected with one another at a region removed from the ABS. An electrically conductive write coil induces a magnetic flux through the write coil. This results in a magnetic write field being emitted toward the adjacent magnetic medium, the write field being substantially perpendicular to the surface of the medium (although it can be canted somewhat, such as by a trailing shield located near the write pole). The magnetic write field locally magnetizes the medium and then travels through the medium and returns to the write head at the loco/inn of the return pole where it is sufficiently spread out and weak that it does not erase previously recorded bits of data.

A magnetoresistive sensor such as a GMR or TMR sensor can be employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode, the resistance of the spin valve sensor changes proportionally to the magnitudes of the magnetic fields from the rotating disk. When a sense current is conducted through the spin valve sensor, resistance changes cause potential changes that are detected and processed as playback signals.

At very small hit sizes it is very important to define the write pole very accurately. For example, processes used to manufacture the write pole defining mask structure can result in the mask structure being poorly defined, with rough sidewalls, irregular undercuts and other deformities. This makes an accurate definition of the write pole difficult to achieve.

SUMMARY OF THE INVENTION

The present invention provides a method for manufacturing a magnetic write head that includes depositing a magnetic write pole material an under-layer material and a dielectric hard mask layer over the under-layer. A photoresist mask is formed over the dielectric hard mask layer. A reactive ion etching (RIE) is then performed to transfer the image of the photoresist mask onto the dielectric hard mask, the reactive ion etching being performed in a chemistry that includes fluorocarbon gases and He.

The presence of He in the fluorocarbon RIE chemistry advantageously allows the dielectric hard mask to be formed with straight well defined sides, with little or no undercutting, rounding or footing. In addition, RIE process parameters such as gas flow ratio and power ratio can be adjusted to further improve the profile of the formed dielectric hard mask.

The dielectric hard mask can be a silicon containing organic hard mask material that can act as a bottom antireflective coating layer as well as a hard mask. In order to form the mask to the desired thickness the dielectric hard mask can be deposited (or coated) and cured in several layers until the desire thickness has been reached.

The art presents a process method to fabricate and control the magnetic laminate pole masks for perpendicular magnetic recording (PMR) write heads. This method relates to techniques using RIE (reactive ion etching) plasma to etch and control the profiles and critical dimensions of the main pole masks. The geometric properties of the main pole at and near the flare point, where the ABS (air bearing surface) is located nearby, are critical to the performance of the write heads, and can be adjusted by the geometric features of the formed main pole masks.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to nit the inventive concepts claimed herein.

Figure 1:
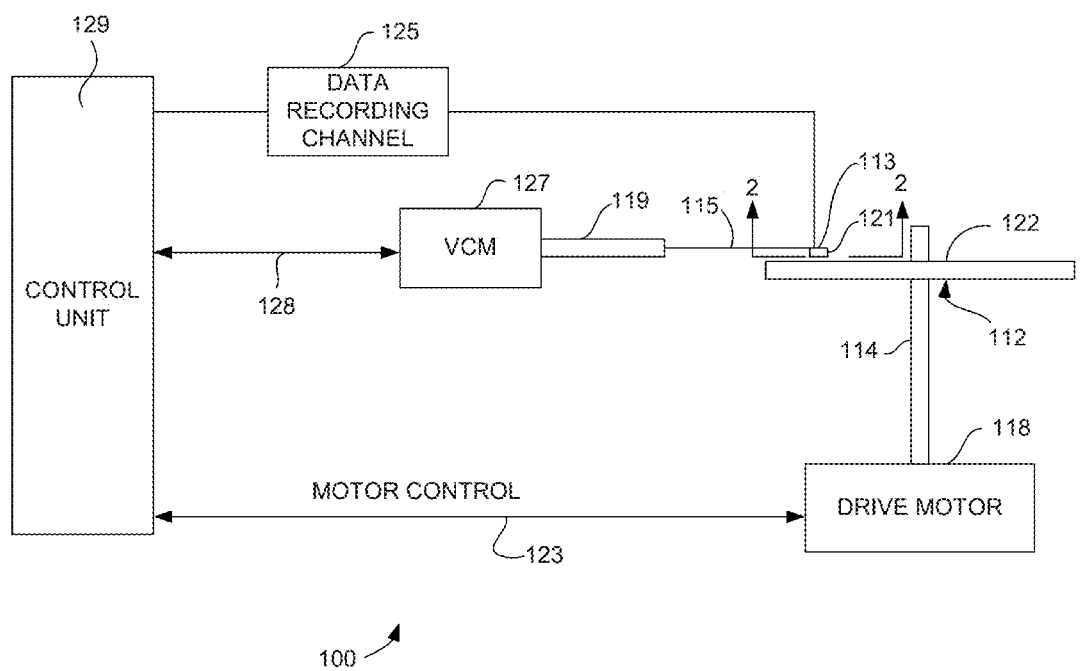
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written and read. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal dock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
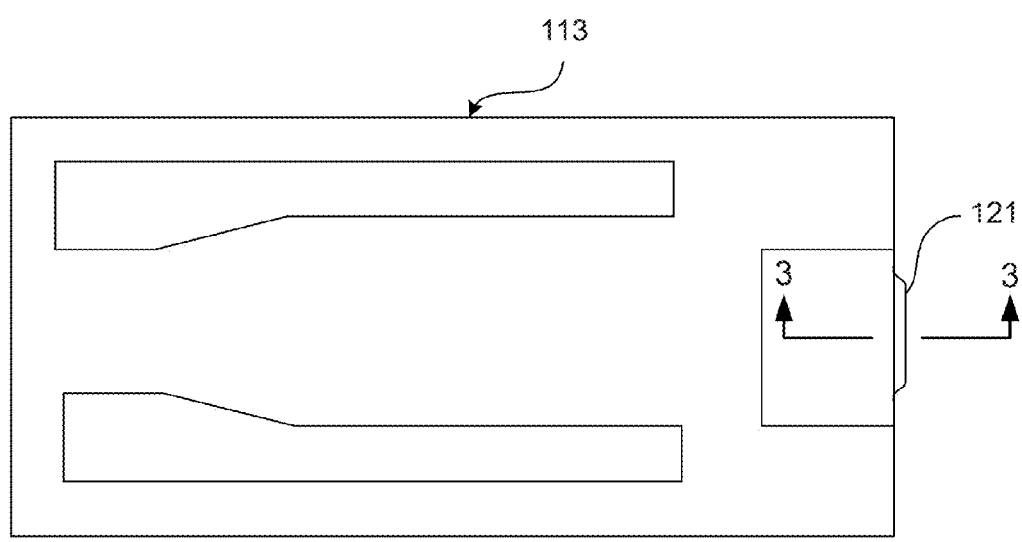
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
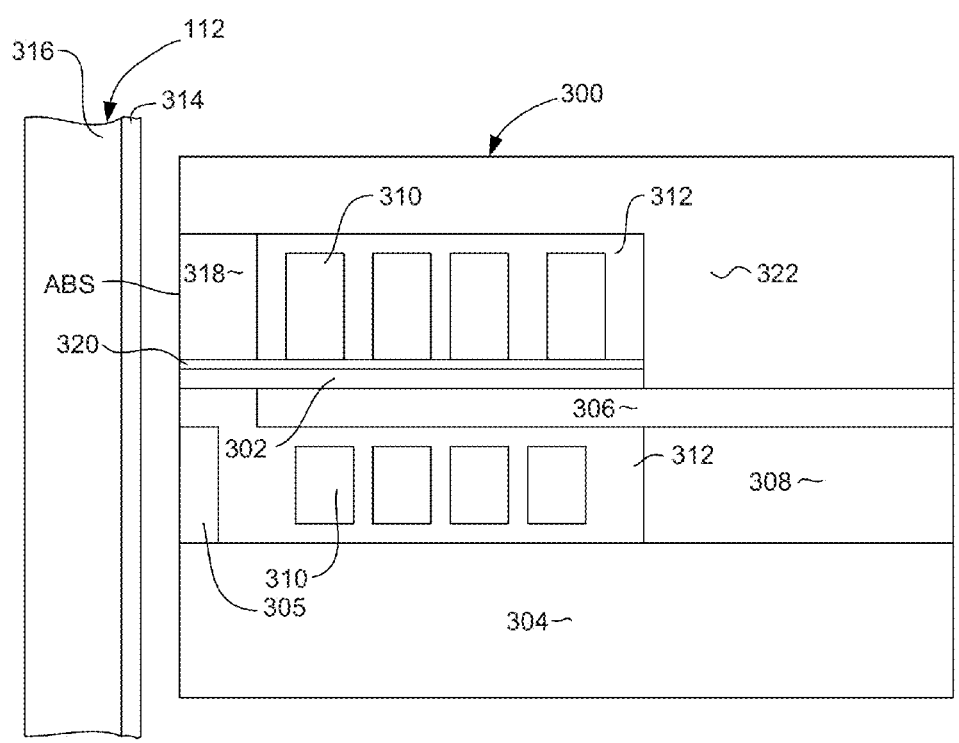
FIG. 3 is a cross sectional view of a magnetic head, taken from line 3-3 of FIG. 2 and rotated 90 degrees counterclockwise, of a magnetic head according to an embodiment of the present invention.

FIG. 3 is a side cross sectional view of a magnetic write head 300 that can be constructed by a method of the present invention. The write head 300 includes a magnetic write pole 302 and a magnetic return pole 304. The magnetic write pole 302 can be connected with a magnetic shaping layer 306 that helps to conduct magnetic flux to the tip of the write pole 302. The write pole 302 and shaping layer 306 can be connected with the magnetic return pole 304 by a magnetic back gap structure 308. A non-magnetic, electrically conductive write coil 310 passes between the return pole 304 and the write pole and shaping layer 302, 306, and may also pass above the write pole and shaping layer 302, 306. The write coil 310 can be encased in a non-magnetic, electrically insulating material 312, which can be a material such as alumina and/or hard baked photoresist. When an electrical current flows through the write coil 310 a magnetic field is induced around the coil 310 that results in a magnetic flux flowing through the return pole 304, back gap layer 308, shaping layer 306 and write pole 302. This results in a write field being emitted from the tip of the write pole 302. This strong, highly concentrated write field locally magnetizes a magnetic top layer 314 of the magnetic media 112. The magnetic field then travels through a soft magnetic under-layer 316 of the magnetic media before returning to the return pole 304, where it is sufficiently spread out and weak that it does not erase the previously recorded bit of data. The write head 300 can also include a magnetic pedestal 305, at the ABS that acts as a shield to prevent stray fields, such as those from the write coil 310 from reaching the magnetic medium 112.

The write head 300 may also include a trailing magnetic shield 318, located at the air bearing surface (ABS) and separated from the write pole 302 by a agnetic trailing gap layer 320. The trailing magnetic shield 318 can be connected with the other magnetic structures at the back of the write head 300 by a trailing magnetic pole 322.

Figure 4:
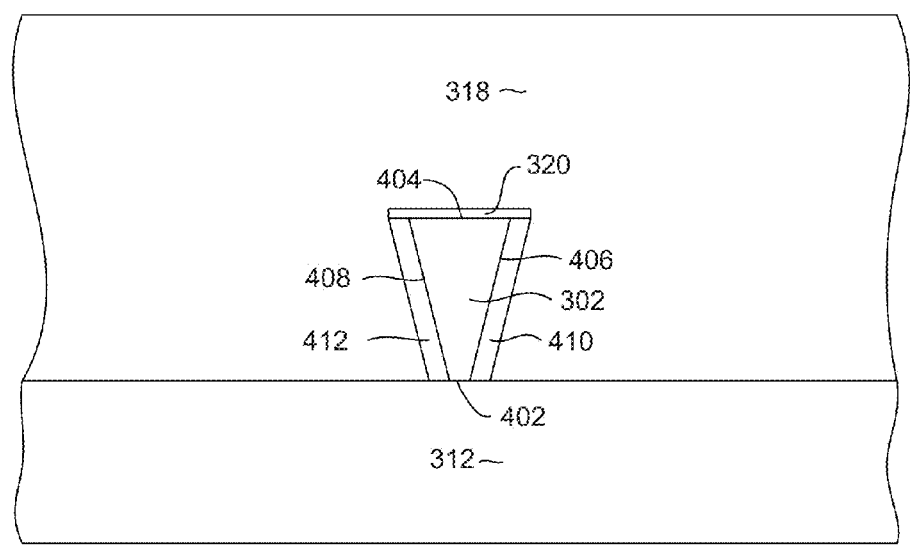
FIG. 4 is an enlarged ABS view of a portion of the write head of FIG. 3.

FIG. 4 is an air bearing surface view (ABS view) of a portion of the magnetic write head 300 of FIG. 3. The view in FIG. 4 is enlarged to more clearly show the write pole 302. In FIG. 4 it can be seen that the write pole 302 has a trapezoidal shape, having a leading edge 402, and a trailing edge 404 and first and second laterally opposed sides 406, 408 that each extend from the leading edge 402 to the trailing edge 404. The leading edge is preferably narrower than the trailing edge, and in many cases, the leading edge is so narrow that its width is virtually zero that the ABS becomes a triangle shape. This shape helps to reduce skew related adjacent track interference when the head is at an extreme inner or outer radial location over the media 112 (FIG. 1). Also as can be seen, the trailing magnetic shield 318 can extend down the sides of the write pole 318 to provide a side shielding function to prevent stray fields from reaching and affecting the magnetic media. The side portions of the shield 318 are separated from the sides 406, 408 of the write pole 302 by non-magnetic side gap layers 410, 412.

Figure 5:
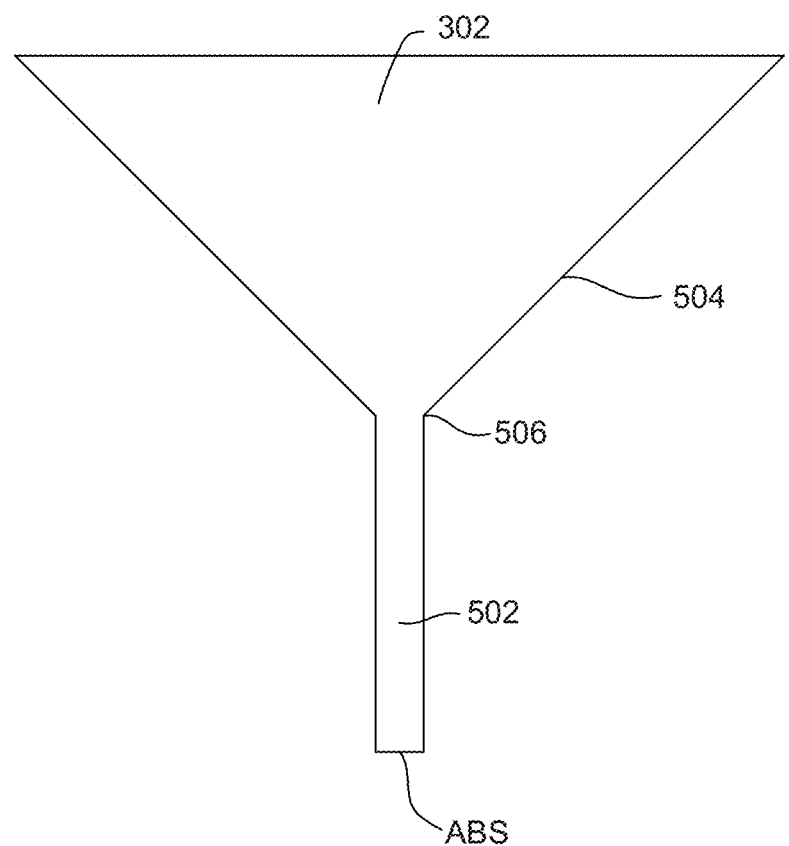
FIG. 5 is a top down view of a write pole of the write head of FIG. 4.

FIG. 5 shows a top down view of the write pole 302. As can be seen in FIG. 5, the write pole 302 has a narrow pole tip portion 502 that can be formed with a relatively constant cross section, and a flared portion 504. The junction between the constant cross section pole tip portion 502 and the flared portion 504 defines a flare point 506. The location of this flare point relative to the ABS is an important parameter to the performance of the write head 302.

Figure 6:
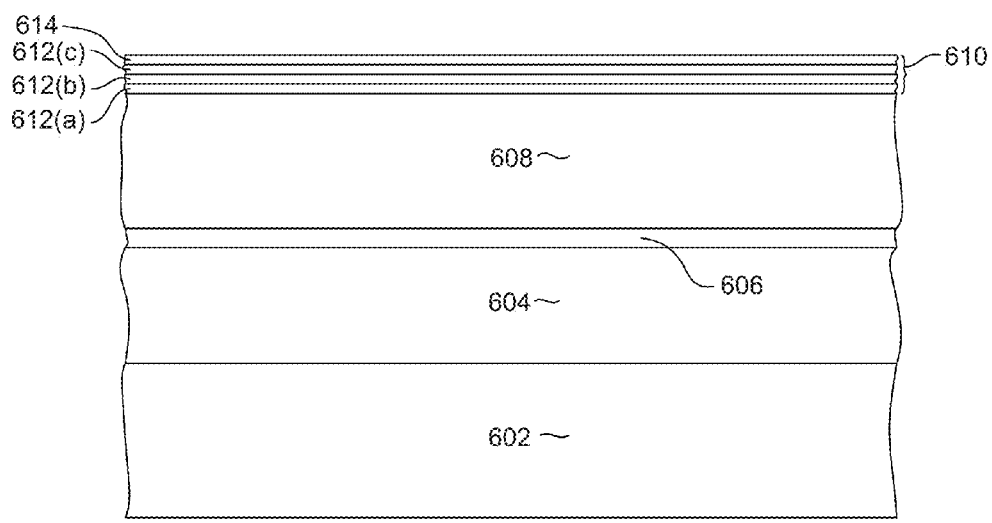
FIGS. 6-9 are views of a portion of a write head in various intermediate stages of manufacture, illustrating a method of manufacturing a magnetic write head according to an embodiment of the invention.

FIGS. 6-9 show a write pole in various intermediate stages of manufacture in order to illustrate a method of manufacturing a magnetic write head according to an embodiment of the invention. With particular reference to FIG. 6, a substrate 602 is provided. The substrate can include a portion of the non-magnetic material 312 of FIG. 3 and at least a portion of the shaping layer 306 of FIG. 3. A magnetic laminate structure 604 is deposited over the substrate 602. The magnetic laminate structure 604 can include layers of magnetic material such as CoFe separated from one another by thin layers of non-magnetic material. For purposes of simplicity, the laminated structure 604 is shown as a single layer in FIG. 6. An ion milling hard mask 606 is deposited over the laminate 604. The ion milling hard mask can be constructed of a material such as Diamond Like Carbon (DLC), carbon, alumina ($Al_2O_3$), Ta etc. A polymer mask under-layer 608 is deposited over the ion milling hard mask layer 606, and a dielectric hard mask 610 is deposited over the under-layer 608. The under-layer 608 is preferably constructed of a polymeric material that can be cured at a relatively low temperature, such as around 150 to 250 degrees C. Examples of such polymeric materials include SIUL® (Shin-Etsu Chemical Co., Ltd.), DURIMIDE® (Fujifilm Corporation), JSR HM8006® (Honeywell International Inc.), ACCUELO T-31® (Honeywell International Inc.), etc.

This under-layer 608 (which also can be referred to as an image transfer layer) provides masking during an ion milling process that will be described herein below. The thickness of the under-layer 608 depends upon the duration and strength of the ion milling that will be performed to define the write pole, however the layer 608 can be from a few hundred nanometers to thousands of nanometers.

The dielectric hard mask layer 610 has a novel construction and is constructed by novel methods that result in the dielectric mask 610 having a very well defined shape, which in turn allows the write pole to be accurately defined, as will become clearer below. The thickness of the dielectric hard mask 610 depends on the thickness of the underlayer 608. Generally, the thicker the under-layer 608 is, the thicker the dielectric hard mask 610 will have to be. With continued reference to FIG. 6, the dielectric hard mask 610 can be formed as multiple layers in order to assure that the dielectric mask has the desired thickness for withstanding patterning processes. To this end, the dielectric mask 610 includes one or more layers of a material that can be patterned by reactive ion etching in one chemistry, but which is resistant to reactive ion etching in another chemistry (to allow patterning of the under-layer 608). The dielectric mask 610 can, therefore, include multiple layers 612(a), 612(b), 613(c), etc. of a material which is preferably a Si containing dielectric material such as silicon oxy-nitride, silicon oxide, silicon nitride, silicon carbide, or a silicon containing organic material (Si rich siloxane polymer) such as SIHM® (Shin-Etsu Chemical Co., Ltd.), UVAS® (Honeywell International Inc.) and etc. An optional Bottom Anti-Reflective Coating (BARC) layer 614 can also be deposited over the layers 612(a-c) in order to assist with photolithographic patterning. The determination of whether a BARC layer 614 is necessary or desired depends upon the materials and thickness of the other lay layers 612(a-c) of the dielectric mask 610. If the material making up the layers 612(a-c) are materials that can serve as BARC layers themselves, then no additional BARC layer 614 is needed. Also, if there is only one layer 612 and this layer is sufficiently thin, then no BARC layer may be needed. For example, silicon oxynitride or a silicon containing organic material such as SIHM® (Shin-Etsu Chemical Co., Ltd.), and UVAS® (Honeywell International Inc.) can function as a hard mask and also serve as an antireflective layer during photolithography. In another case, where only silicon oxide, silicon nitride, or silicon carbide is deposited, no BARC coating is necessary due to the relatively loose control requirement on critical dimensions. However, in cases where both dielectric hard mask layers 612 and a separate BARE layer are applied, the layer or layers 612 will serve as a hard mask during RIE patterning of the under-layer 608 and the layer 614 will serve as an antireflective layer during photoresist mask patterning to reduce the photolithographic swing and to achieve better critical dimension control. When the layer or layers 612 are Si containing organic hard mask materials, they can serve as both hard mask and BARC layers.

The thickness of the under-layer 608 can vary broadly, depending on the requirements of the subsequent ion milling process (which will be described below). Usually, a few hundred to thousands of nanometers of under-layer 608 need to be applied. The thickness of the hard mask layer 610 can vary widely as well, depending upon the thickness of the under-layer 608 and the etch rate and selectivity between the materials of the dielectric hard mask 610 and under-layer 608. Generally, the thicker the under-layer is, the thicker the dielectric hard mask 610 must be. In practice, the thickness of the dielectric hard mask 610 varies from tens of nanometers to a few hundred nanometers.

Because silicon containing organic hard mask materials are preferably used as the layers of the dielectric hard mask 610 to provide both hard mask properties as well as BARC properties, there is a limit to how thick these materials can be applied in a single application. Film uniformity will be an issue for a film 612 that is deposited too thick. In order to ensure optimal hard mask 610 thickness while also ensuring film uniformity, the layers 612 are deposited as multiple layers 612(a)-612(c), separately deposited. The number of layers 612 depends on the total thickness needed.

Figure 10:
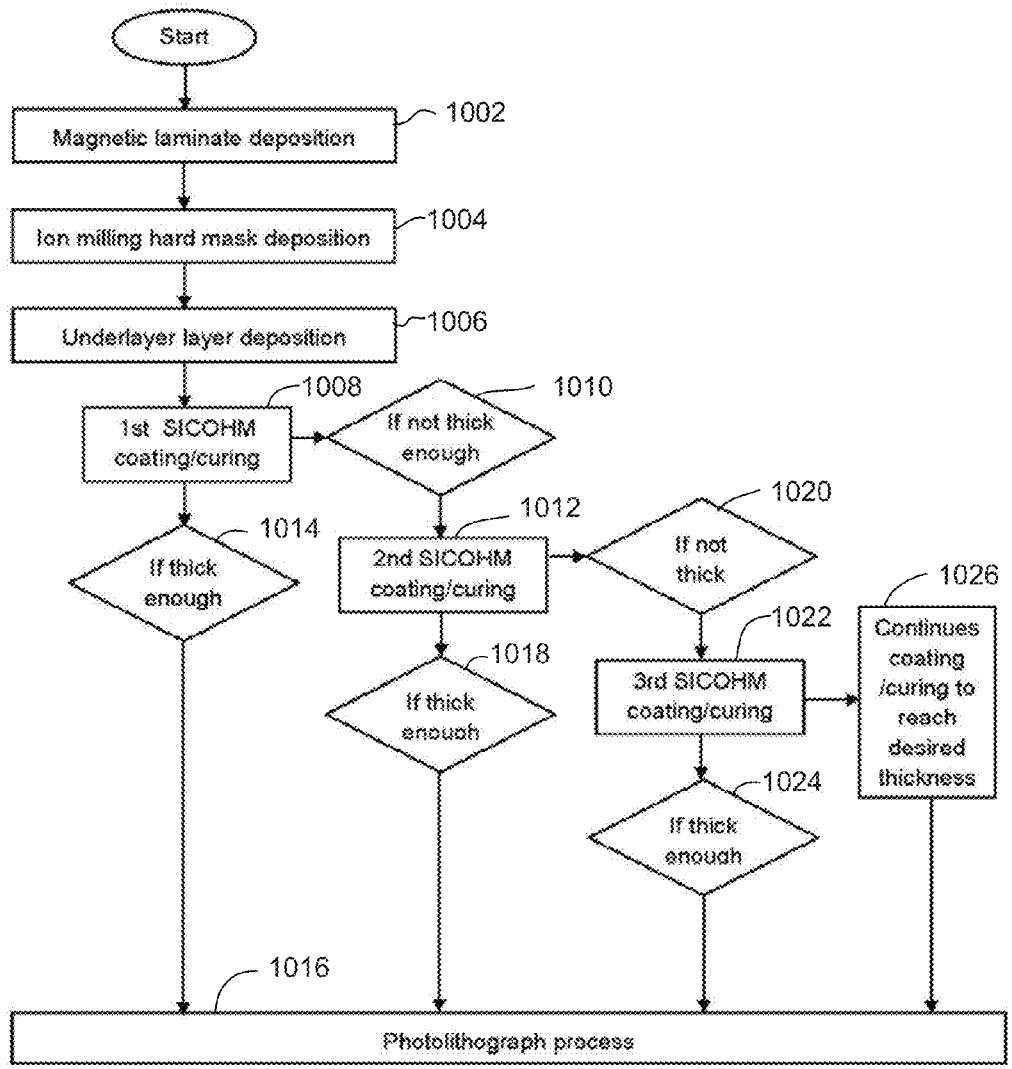
FIG. 10 illustrates a process flow chart to obtain a Si containing organic hard mask film of a desired thickness using multiple coating and curing operations.

A process flow chart, as illustrated in FIG. 10, can be used to form the Si containing organic hard mask (SICOHM) through multiple coating and curing operations. The formation of the hard mask 610 is as follows. First, in a step 1002, a magnetic write pole material or laminate is deposited. Then, in a step 1004, an ion milling hard mask is deposited. Then, in a step 1006 an under-layer is deposited. Then, after deposition of the under-layer, in a step 1008 a first layer of silicon containing organic hard mask material is deposited (i.e. spin coated) and then cured (i.e. baked or hardened). If this first layer is sufficiently thick (decision step 1014) the process proceeds to a photolithographic process 1016. If the thickness of this first layer is not sufficient (decision step 1010), then in a step 1012 another layer of silicon containing organic hard mask material is deposited and cured. If the combined first and second layers are sufficiently thick (decision step 1018), then the process proceeds to step 1016. If the thickness of these combined first and second layers are still insufficient (decision step 1020, then in a step 1022 another layer (e.g. third layer) is deposited and cured. This process is repeated until the thickness of the hard mask 610 is sufficient. If the combined layers are sufficiently thick (decision step 1024), then the process proceeds to step 1016. If the combined layers are still not sufficiently thick then the process continues (step 1026) until the desired sufficient thickness has been achieved.

Figure 7:
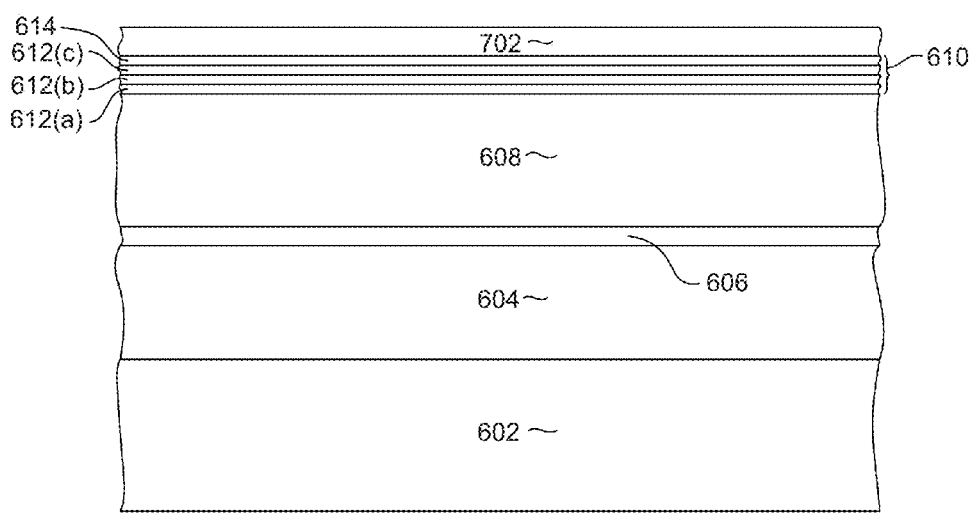
Figure 8:
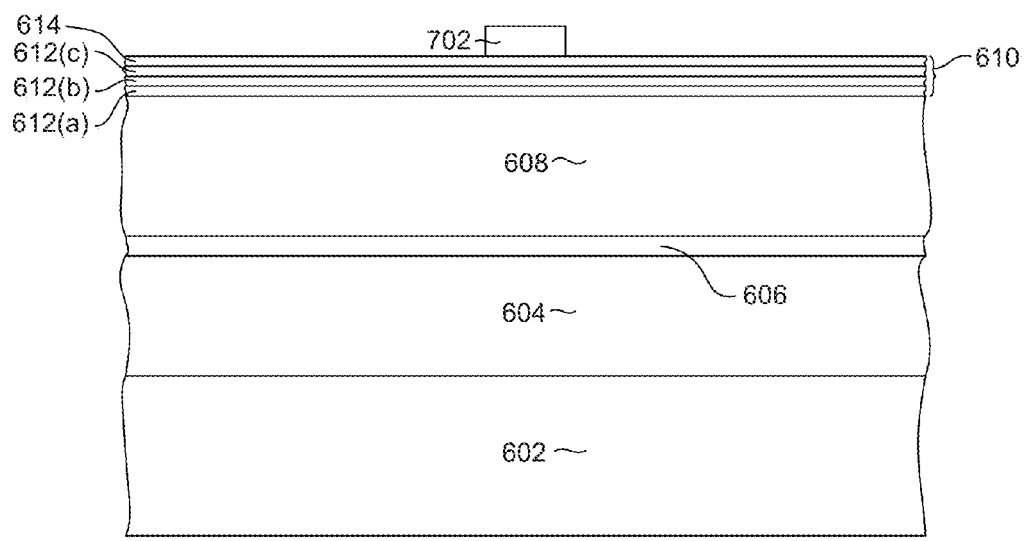

Therefore, while three layers 612(*a-c*) are shown in FIGS. 6-8, this is by way of example. The number of layers 612 could be any number that is needed to achieve the desired total thickness. It should be pointed out again, that if the layers 612 are silicon containing organic hard mask materials, they will provide BARC function and the separate BARC layer 614 will not be needed.

After the dielectric hard mask layer 610 has been formed to the desired thickness, a layer of photoresist 702 is coated by a spin coating method, leaving a structure as shown in FIG. 7. The photoresist layer 702 is then photolithographically patterned to define a photoresist mask 702 as shown in cross section FIG. 8. The photoresist mask 702 will have a shape that is configured to define the desired shape of a write pole, as will be seen below.

Figure 9:
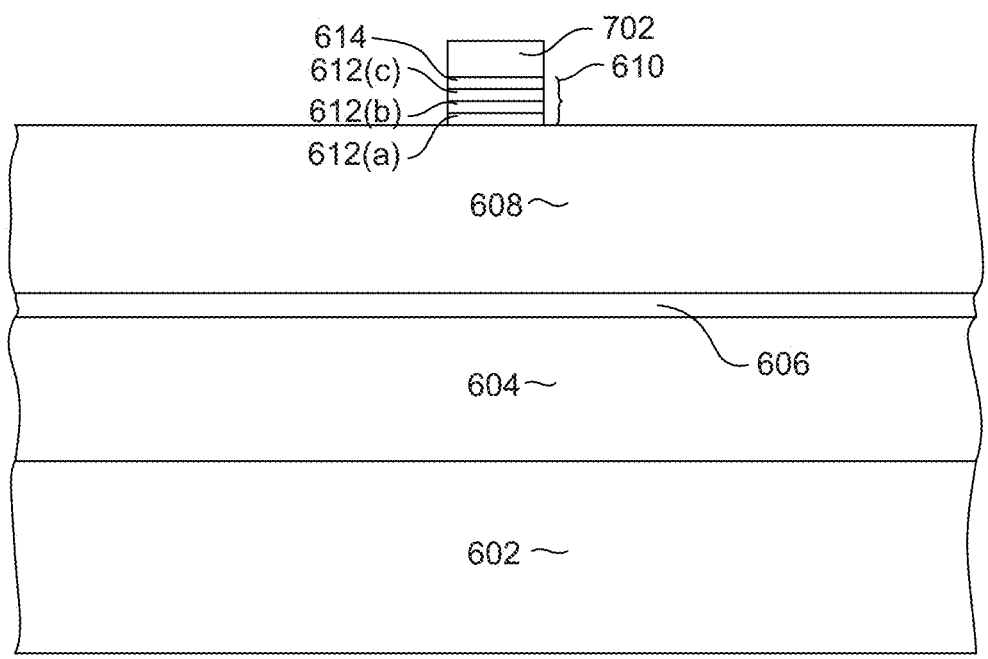

With reference now to FIG. 9, after the photoresist mask 702 has been patterned, a reactive ion etching is performed to transfer the image of the photoresist onto the dielectric hard mask. The exposed dielectric hard mask 610 is etched in a RIE etching tool by performing an etching process using the patterned photoresist 702 as an etching mask.

One plasma tool especially suitable for the RIE process to etch the Si containing dielectric hard mask material and polymer mask under-layer is Plasma-Therm's® Versalock® etcher, which is an inductively coupled plasma (ICP) etch system in which the plasma is generated by means of inductively coupling 2 MHz RF power (the source power) while independently controlling the ion energy directed toward the substrate via 13.56 MHz, bias power. This separate power control allows a wider range of RIE processes to be performed, ranging from highly chemical processes to highly physical processes. The Versalock® etcher is equipped with Optical Emission Spectrometry (OES) endpoint system that the over-etch amount can be precisely controlled via the determination of etch endpoint.

Many Other ICP etchers equipped with both source and bias power suppliers, such as TCP9400DFM® from Lam Research Inc.®, or DPS® from Applied Materials Inc.®, can also be used for the RIE process of the Si containing dielectric hard mask material and polymer mask under-layer. We expect that the RIE process presented in this art can be transferable transparently in different ICP etchers. If fact, our test in a TCP9400DFM® from Lam Research Inc. OD confirmed that it could give the same results as we have obtained in Plasma-Therm's Versalock® etcher by doing minor tuning of the RIE parameters.

The exposed dielectric hard mask 610 (FIG. 9) is removed by the RIE plasma consisting of a mixed gas of $CF_4$, $CHF_3$ and He. It is preferable that both $CF_4$ and $CHF_3$ gas flow is in the range of 5 to 50 sccm, and the He gas flow is no more than 30 sccm.

The etch rate and uniformity of the etching of the Si containing dielectric hard mask 610 (FIG. 9) as well as the etch rate selectivity between the photoresist 702 and mask 610 on field and at the shoulder portion of the mask 610 can be adjusted using the aforementioned etching gases a long with the etching tool parameters such as chamber pressure, bias power, source power, the temperature of the wafer or the temperature of the chuck on which the wafer is held) and backside helium cooling pressure. However, the temperature of the wafer and backside helium cooling pressure usually have only a secondary effect on the out-coming results and are also not so convenient to adjust due to the restriction of tool sharing with many other production processes and thus usually remain as constants.

The total chamber pressure can be in a lower range from 2 to 10 mT which provides a good etch rate. The most effective mechanism for adjusting the side wall profile of the dielectric hard mask 610 and the mask (610) to photoresist (702) selectivity are the ratios between gas flows (i.e. $CF_4$ to $CHF_3$) and the ratios between powers (i.e. source power to bias power). By carefully balancing these two ratios, it is possible to obtain almost all of the desired dielectric hard mask 610 features, including: straight side wall profile; less shoulder rounding at the top of dielectric hard mask 610; no footing or undercut at the bottom of the dielectric hard mask; good CD uniformity throughout wafer; sufficient remaining photoresist; sufficient over-etch amount, etc.

Generally, to use dry plasma to etch silicon containing materials such as silicon oxide, silicon nitride, the plasma chemistry is mostly a combination of fluorine containing gases (such as $CF_4$, $CHF_3$), oxygen ($O_2$) nitrogen and Argon (Ar). For thick enough photoresist mask, oxygen ($O_2$) and nitrogen ($N_2$) may be introduced for tuning side wall profile, etch rate, uniformity and selectivity. However, if the thickness of photoresist is thin or its etch rate selectivity is low, oxygen and nitrogen may reduce the photoresist thickness too much during RIE process, thereby affecting the quality of the formed mask. For this reason, it may not be beneficial to use oxygen and nitrogen gas in process tuning. Ai could be used to dilute the etchants in the plasma and provide leaner chemistry, providing a beneficial effect on the side wall profile of the mask 610, however, Ar may cause high physical bombardment on the shoulders of photoresist 702 and mask 610 and thus it may not be the desirable to add Ar in etching gas. In an embodiment of the present invention, an alternate gas (i.e. helium (He)) is added to the RIE chamber and mixed with $CF_4$ and $CHF_3$. The advantage of He is that it is much less ionized than Ar, and has much less mass than Ar, therefore its physical etching effect on the shoulder areas of the mask is minimum comparing with Ar, but it still functions to tune the side wall profile. A ratio of about 0.25 to 5 between He and $CHF_3$ can be beneficial in providing this function. It should be pointed out that too much helium gas may make it difficult to strike a plasma and maintain the stable etching plasma due to the very low ionization ability of helium atoms.

To adjust the side wall profile of the dielectric hard mask 610, two major parameters can be employed: one is the ratio (named as gas-ratio (OR) in this art) between $CF_4$ and $CHF_3$ gas flow, another one is the ratio (named as power-ratio (PR)) between the source power and the bias power.

At a constant power ratio, the side wall profile will exhibit more undercut at higher gas-ratio and gradually reduced undercut with decreasing gas-ratio (GR), and exhibits a vertical profile, and then a tapered profile with further decreasing gas-ratio. For example for PR=25, at GR=5, mask 610 will have an obvious undercut around the middle height of the mask. With decreasing GR, i.e. GR~0.75, the profile of the mask 610 becomes vertical, and then with further decreasing GR value, (i.e. GR~0.4), the mask 610 profile appears to be taper. On the other hand, while keep gas-ratio at constant (i.e. GR=1) the side wall profile will vary with the changing of power-ratio. The profile of the mask 610 will have an undercut side wall shape at high power-ratio (i.e. PR~25), and the undercut will gradually decrease with decreasing of power-ratio, becoming a vertical profile at PR~20 and then becoming a tapered profile with further decreasing power-ratio (i.e. PR~15).

Generally, different etching gasses have different effects on side wall profile. The formed fluorinated polymer tends to hinder the further etching on where it is formed. The more polymer formation the slower the etching, and sometimes it may cause etching to stop altogether. Usually, the deeper the etching goes, the more polymer formation there will be, thus the side wall profile tends to incline (or taper) that it may have smaller line CD at top than at bottom of the mask 610. $CF_4$ gas tends to deposit much less polymer than CHF) on the etched side wall of the dielectric hard mask 610. The plasma etching with lower gas-ratio (i.e. less $CF_4$ and more $CHF_3$ in mixed gas) tends to dump more fluorine containing polymers on the side wall of the mask 610, thus making the profile taper. Higher gas-ratio GS means less $CHF_3$ flow and relatively more $CF_4$ and He, resulting in less fluorine polymer formation on the side wall of the etched mask 610 and causing the profile to be more vertical.

Another factor, i.e. power-ratio (PR) can also be employed to tune the mask profile. Higher power-ratio means more source power which generates more non-directional ions that they tends to have isotropic etching effect, and will etch side wall more strongly so that the mask 610 profile tends to have an undercut shape, especially at the middle-height portion of the mask. Lower power-ratio means more bias power which creates more directional moving ions and tends to have anisotropic etching (i.e. vertical downward etching) and gives rise to more physical etching (bombardment), resulting in the mask 610 having a tapered side wall profile since the top portion of the dielectric hard mask 610 experiences longer exposition than the bottom portion of the dielectric mask 610.

Figure 13:
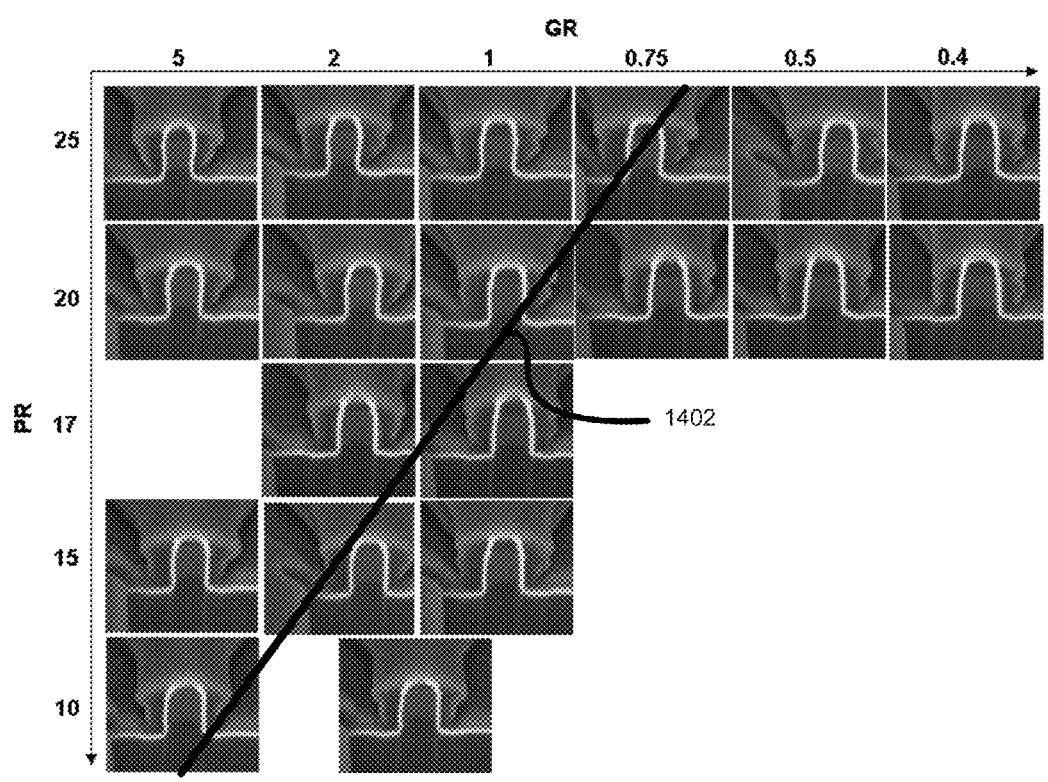
FIG. 13 is a graph illustrating dielectric mask profiles for various gas ratios (GR) and power ratios (PR) of in a reactive ion etching process.

Therefore, control of the side wall profile of the dielectric hard mask 610 can be realized through the combination of two ratios (i.e. GR and PR), as illustrated in FIG. 13. A vertical side wall profile is obtained at those GR and PR indicated by the thick solid line 1402 drawn on the FIG. 13. This line 1402 divides the RIE process into two regions, on the right side of line 1402 the process tends to give taper side wall profile, less photoresist remaining and larger bottom CD. On the left side of the line 1402, the RIE process tends to have more undercut shape profile, more photoresist remaining and smaller mask CD. By choosing the proper RIE condition (i.e. proper GR and PR), one can get desired side wall profile along with desired photoresist remaining and CD requirement.

Figure 14:
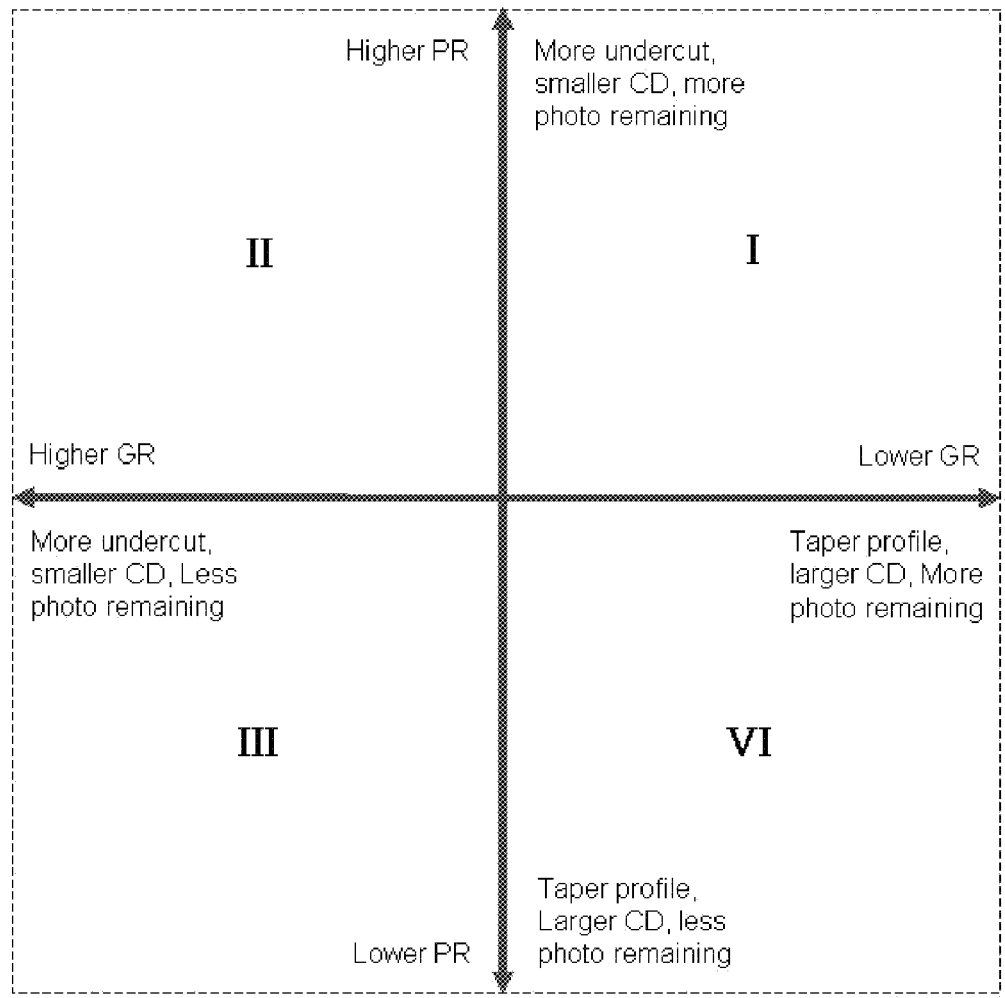
FIG. 14 is a graph further illustrating the effect of gas ratio and power ratio on dielectric mask profile.

A more comprehensive summary is presented in FIG. 14, in which not only the profile trend but also the other affected parameters such as photo resist remaining and CD size are presented. In FIG. 14, a two-dimensional diagram is drawn wherein the x-axis represents the GR and y-axis represents the PR. The two axes divide the plane into four regions: I, II, III and VI, just like the ordinary Cartesian coordinate system. Four directions have been label as Lower GR, Higher GR, Lower PR and Higher PR along with corresponding effects on the resultant dielectric hard mask 610, including profile, CD and photo resist remaining. In region-I, where increasing PR and lowing GR tend to compensate to each other on profile and CD, but enhance on the photoresist remaining. In region-III, where decreasing PR and increasing GR tends to have compensation again on both profile and CD, but reduce the photoresist remaining at the same time. Within these two regions, it is possible that through adjusting the two ratios (one increasing and another one decreasing), the profile and CD of the dielectric hard mask 610 can be adjusted to meet the requirements. In region-II (both PR and GR increasing) the profile tends to have enhanced undercut and CD tends to be smaller, but photoresist remaining can be compensated. In region-VI (both PR and GR decreasing) the mask 610 profile is more tapered and has larger bottom CD, but photoresist remaining can be compensated. In these two regions, either increasing both PR and GR, or decreasing both PR and GR at the same time will results in even more undercut and smaller CD, or even more taper profile and large CD.

In reality, besides consideration of the side wall profile and CD of the dielectric hard mask, other factors such as shoulder rounding, CD bias variation (i.e. pre photoresist CD to post RIE after plasma etching) must also be considered to obtain right dielectric hard mask 610. Generally, lower gas-ratio and high power-ratio tends to consume less photoresist and results in less shoulder rounding at the top of the dielectric hard mask 610, but could also lead to more shrinkage of CD and more undercut. Higher gas-ratio and lower power-ratio intends to consume more photoresist, thus having more shoulder rounding at the top of the dielectric hard mask, and could have taper side walls and also increases resultant bottom CD of the dielectric hard mask 610. In addition, more process factors have to be considered such as etch rate, uniformity (etch rate and CD) and selectivity, and hardware factors also have to be considered such as plasma striking ability and plasma stability, and endpoint performance. With concerns on all these factors, it is much more complicated to tune a proper dielectric hard mask process than only adjusting two parameters PR and GR, one need to have careful thought to balance various requirements.

Figure 11:
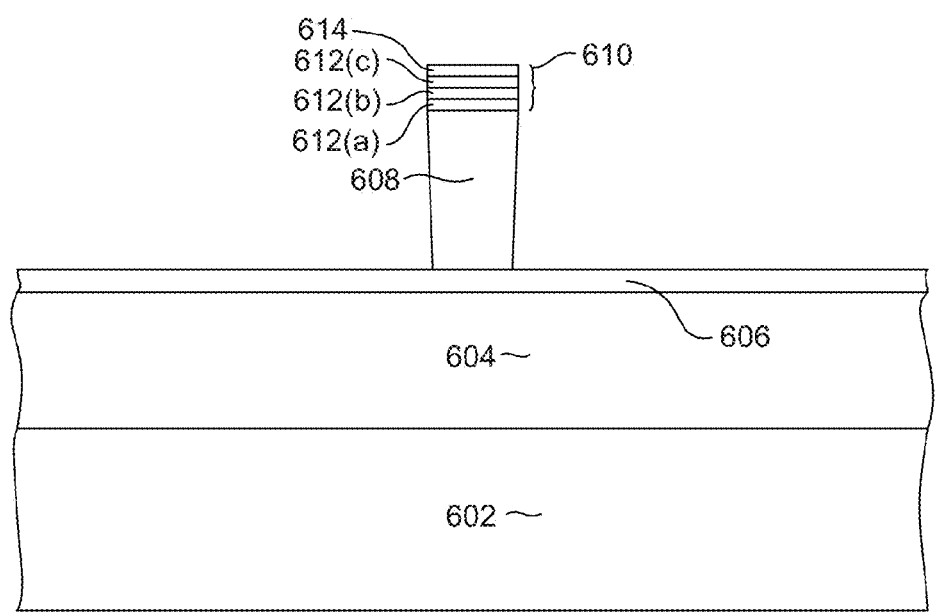
FIG. 11-12 are views of a portion of a write head in intermediate stages of manufacture, further illustrating a method of manufacturing a magnetic write head according to an embodiment of the invention.
Figure 12:
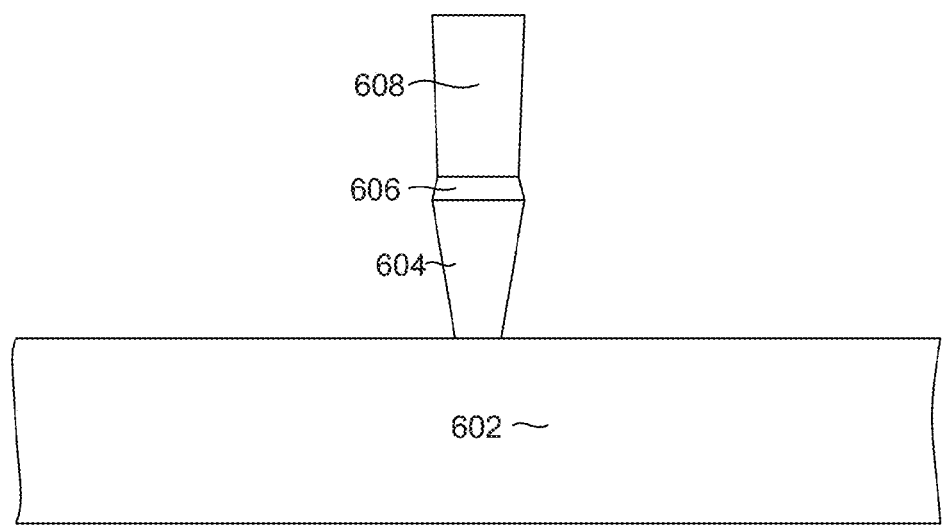

The above describes in detail a novel process for forming the dielectric hard mask 610 as shown in FIG. 9. This process results in a very well defined dielectric hard mask 610 that can be accurately and predictably used to pattern a write pole as will be described below. With the dielectric hard mask 610 formed as described in FIG. 9, a second reactive ion etching can be performed to transfer the image of the dielectric hard mask 610 onto the under-layer 608, leaving a structure as shown in FIG. 11. This reactive ion etching (RIE) can be performed in an oxygen containing gas chemistry, such as $CO_2$ or $O_2$. In addition, a small amount of nitrogen gas ($N_2$) can be added to the gas during this second RIE to improve the properties of this RIE in forming a well defined under-layer mask 608 having straight side walls with little or no undercutting, and without footing at the bottom of the under-layer mask 608. With the mask 608 thus patterned, an ion milling can be used to transfer the image of the under-layer mask 608 onto the under-lying ion milling hard mask 606 and the magnetic write pole material 604 forming a write pole structure 604 as shown in FIG. 12. This ion milling can be a sweeping ion milling that cat be performed at one or more angles relative to normal in order to form the write pole with tapered side walls as shown in FIG. 12.

From the above it can be seen that the initial patterning of the dielectric hard mask 610 determines the patterned profile of the other layers 608, 606, 604. Therefore, the above process for forming a well defined dielectric mask provides an invaluable tool in accurately forming the write pole 604, even at very small dimensions.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
   depositing a magnetic write pole material;
   depositing an under-layer material;
   depositing a dielectric hard mask over the under-layer;
   forming a photoresist mask over the under-layer; and
   performing a reactive ion etching to transfer the image of the photoresist mask onto the dielectric hard mask, wherein the reactive ion etching is performed in a chemistry comprising fluorine containing gases and He;

wherein the reactive ion etching is performed in a reactive ion etching tool, and wherein a $CF_4$ gas is input into the reactive ion etching tool at a first gas flow rate and a $CHF_3$ gas is input into the reactive ion etching tool at a second gas flow rate, and wherein the ratio of the first gas flow rate to the second gas flow rate is adjusted to form the dielectric hard mask with straight side walls.

2. The method as in claim 1 wherein the reactive ion etching is performed in an atmosphere that contains and He.

3. The method as in claim 2 wherein the reactive ion etching is performed with a CF4 gas flow of 5 to 50 sccm, a $CHF_3$ gas flow of 5 to 50 sccm and a He gas flow of no more than 30 sccm.

4. The method as in claim 2 wherein He is input at a third gas flow rate, the third gas flow rate being 0.25 to 5 times the second gas flow rate.

5. The method as in claim 1 wherein the reactive ion etching is performed in the reactive ion etching tool that includes a source power and a bias power, and wherein the ratio of source power to bias power is from about 25 to about 10.

6. The method as in claim 1 further comprising, after performing the reactive ion etching to transfer the image of the photoresist mask onto the dielectric hard mask, performing a second reactive ion etching to transfer the image of the dielectric hard mask onto the under-layer.

7. The method as in claim 6 wherein the under-layer comprises a polymer mask material.

8. The method as in claim 1 wherein the dielectric hard mask is a silicon containing dielectric material and wherein the under-layer is a polymer mask material.

9. The method as in claim 1, further comprising:
after depositing the magnetic write pole material and before depositing the under-layer, depositing an ion milling mask; and
after performing the reactive ion etching to transfer the image of the photoresist mask onto the dielectric hard mask, performing a second reactive ion etching to transfer the image of the dielectric hard mask onto the under-layer; and
after performing the second reactive ion etching, performing an ion milling to transfer the image of the under-layer onto the ion milling hard mask and the magnetic write pole material.

10. A method for manufacturing a magnetic write head, comprising:
depositing a magnetic write pole material;
depositing an under-layer material;
depositing a dielectric hard mask over the under-layer;
forming a photoresist mask over the under-layer; and
performing a reactive ion etching to transfer the image of the photoresist mask onto the dielectric hard mask, wherein the reactive ion etching is performed in a chemistry comprising fluorine containing gases and He;
wherein the reactive ion etching is performed in an atmosphere that contains $CF_4$, $CHF_3$ and He; and
wherein the reactive ion etching is performed in a reactive ion etching tool, and wherein the $CF_4$ is input into the reactive ion etching tool at a first gas flow rate and the $CHF_3$ is input into the reactive ion etching tool at a second gas flow rate, and wherein the ratio of the first gas flow rate to the second gas flow rate is from about 5 to about 0.4.

11. A method for manufacturing a magnetic write head, comprising:
depositing a magnetic write pole material;
depositing an under-layer material;
depositing a dielectric hard mask over the under-layer;
forming a photoresist mask over the under-layer; and
performing a reactive ion etching to transfer the image of the photoresist mask onto the dielectric hard mask, wherein the reactive ion etching is performed in a chemistry comprising fluorine containing gases and He;
wherein the reactive ion etching is performed in an atmosphere that contains $CF_4$, $CHF_3$ and He; and
wherein the reactive ion etching is performed in a reactive ion etching tool that includes a source power and a bias power and wherein the ratio of source power to bias power defines a power ratio, and wherein the $CF_4$ is input into the reactive ion etching tool at a first gas flow rate and the $CHF_3$ is input into the reactive ion etching tool at a second gas flow rate, the ratio of the first gas flow rate to the second gas flow rate defining a gas ratio, and wherein the power ratio and gas ratio are adjusted so that the reactive ion etching produces straight vertical side walls on the dielectric mask.

12. A method for manufacturing a magnetic write head, comprising:
depositing a magnetic write pole material;
depositing an under-layer material;
depositing a dielectric hard mask over the under-layer, the depositing of the dielectric hard mask comprising depositing and curing a first layer of silicon containing organic hard mask material, determining a thickness of the dielectric hard mask, if a desired thickness has not been reached, depositing and curing as second layer of silicon containing organic hard mask and again determining a thickness of the dielectric hard mask, and continuing to deposit and cure subsequent layers of silicon containing organic hard mask until a desired thickness of the dielectric hard mask has been reached;
forming a photoresist mask over the dielectric hard mask layer; and
performing a reactive ion etching to transfer the image of the photoresist mask onto the dielectric hard mask, wherein the reactive ion etching is performed in a chemistry with fluorine containing gases and He.

13. The method as in claim 12 wherein the reactive ion etching is performed in an atmosphere that contains $CF_4$, $CHF_3$ and He.

14. The method as in claim 13 wherein the reactive ion etching is performed with a $CF_4$ gas flow of 5 to 50 sccm, a $CHF_3$ gas flow of 5 to 50 sccm and a He gas flow of no more than 30 sccm.

15. The method as in claim 13 wherein the reactive ion etching is performed in a reactive ion etching tool, and wherein the $CF_4$ is input into the reactive ion etching tool at a first gas flow rate and the $CHF_3$ is input into the reactive ion etching tool at a second gas flow rate, and wherein the ratio of the first gas flow rate to the second gas flow rate is adjusted to form the dielectric hard mask with straight side walls.

16. The method as in claim 13 wherein the reactive ion etching is performed in a reactive ion etching tool, and wherein the $CF_4$ is input into the reactive ion etching tool at a first gas flow rate and the $CHF_3$ is input into the reactive ion etching tool at a second gas flow rate, and wherein the ratio of the first gas flow rate to the second gas flow rate from about 5 to about 0.4.

17. The method as in claim 13 wherein reactive ion etching is performed with a gas flow rate of He that is 0.25 to 5 times a gas flow rate of $CHF_3$.

18. The method as in claim 13 wherein the reactive ion etching is performed in a reactive ion etching tool that includes a source power and a bias power and wherein the ratio of source power to bias power defines a power ratio, and wherein the $CF_4$ is input into the reactive ion etching tool at a first gas flow rate and the $CHF_3$ is input into the reactive ion etching tool at a second gas flow rate, the ratio of the first gas flow rate to the second gas flow rate defining a gas ratio, and wherein the power ratio and gas ratio are adjusted so that the reactive ion etching produces straight vertical side walls on the dielectric hard mask.

19. The method as in claim 12 wherein the reactive ion etching is performed in a reactive ion etching tool that includes a source power and a bias power, and wherein the ratio of source power to bias power is from about 25 to about 10.

* * * * *